(12) United States Patent
Matsumoto et al.

(10) Patent No.: US 6,185,924 B1
(45) Date of Patent: Feb. 13, 2001

(54) GAS TURBINE WITH TURBINE BLADE COOLING

(75) Inventors: Manabu Matsumoto, Ibaraki-machi; Shinya Marushima, Hitachinaka; Takashi Ikeguchi, Hitachi; Kazuhiko Kawaike, Hitachinaka, all of (JP)

(73) Assignee: Hitachi, Ltd., Tokyo (JP)

( * ) Notice: Under 35 U.S.C. 154(b), the term of this patent shall be extended for 0 days.

(21) Appl. No.: 09/173,171

(22) Filed: Oct. 15, 1998

(30) Foreign Application Priority Data

Oct. 17, 1997 (JP) .................................................. 9-284852
Nov. 20, 1997 (JP) .................................................. 9-319290

(51) Int. Cl.[7] ...................................................... F04D 29/58
(52) U.S. Cl. ........................ 60/39.75; 415/110; 415/115; 416/95; 416/96 R
(58) Field of Search ................................ 60/39.07, 39.75; 415/110, 116, 117; 416/95, 96 R, 97 R

(56) References Cited

U.S. PATENT DOCUMENTS

| 3,742,706 | 7/1973 | Klompas . | |
|---|---|---|---|
| 3,936,215 | 2/1976 | Hoff . | |
| 5,695,319 | * 12/1997 | Matsumoto et al. | 60/39.75 |
| 5,755,556 | * 5/1998 | Hultgren et al. | 60/39.75 |
| 6,007,299 | * 12/1999 | Uematsu | 416/96 R |
| 6,053,701 | * 4/2000 | Ichiryu et al. | 416/96 R |

FOREIGN PATENT DOCUMENTS

| 735238 | 10/1996 | (EP) . |
|---|---|---|
| 965726 | 12/1999 | (EP) . |
| 54-13809 | 2/1979 | (JP) . |
| 3-275946 | 12/1991 | (JP) . |
| 7-189739 | 7/1995 | (JP) . |
| 8-014064 | 1/1996 | (JP) . |
| 8-277725 | 10/1996 | (JP) . |
| 9-13902 | 1/1997 | (JP) . |
| 9-195702 | 7/1997 | (JP) . |
| WO9823851 | 6/1998 | (WO) . |

* cited by examiner

Primary Examiner—Charles G. Freay
(74) Attorney, Agent, or Firm—Mattingly, Stanger & Malur

(57) ABSTRACT

A high efficiency coolant collection type gas turbine is obtained by forming coolant supply and collection flow paths for moving blades in a more outer peripheral side of a gas turbine rotor than a hub, supplying the coolant supplied from a shaft end into the moving blades through the supply flow path, collecting the coolant after cooling into a combustion chamber side, supplying air extracted from a compressor to cool moving blades of a downstream side stage or a rotor outer wall through slits formed from a turbine rotor central portion to the hub, reducing rotor thermal stress and a pressure loss of the coolant flow paths and cooling a high stage side of a compressor rotor.

4 Claims, 11 Drawing Sheets

GAS TURBINE WITH TURBINE BLADE COOLING

BACKGROUND OF THE INVENTION

The present invention relates to a gas turbine having moving blades cooled with a coolant and, more particularly, to a coolant collection type gas turbine provided with flow paths for cooling moving blades inside the gas turbine rotor and made so as to collect the coolant after cooling the moving blades.

Moving blades of a gas turbine, usually, are cooled with air supplied through an interior of a rotor in order to protect them from a high temperature combustion gas flowing in a combustion gas path (hereunder referred to as a gas path). Usually, a part of compressed air for combustion is used as a source of the air and discharged into the gas path after cooling.

In gas turbines the higher the combustion gas temperature, the higher the efficiency. However, since a thermal load increases by making the combustion gas temperature higher, a flow rate of a cooling air is inherently increased. Discharging the cooling air into the gas path not only decreases the temperature of combustion gas, but disturbs a flow in the gas path and decreases the output performance of the turbine. Further, a coolant flowing in a circulating flow path in the rotor has revolution energy proportional to 2 powers of the radius, however, discharging the coolant from the moving blades arranged on the outer periphery of the rotor causes a lot of pumping power loss, and the loss increases proportionally to a flow rate of the coolant. Therefore, an effective efficiency improvement can not be expected by only making the temperature of combustion gas higher.

In order to improve further the performance, it is necessary to collect the air supplied for cooling the moving blades to solve the above-mentioned problems.

Therefore, for example, in a gas turbine disclosed in JP A 54-13809, a method of forming a course of supplying and collecting a coolant with piping inside the rotor is proposed, and in a gas turbine disclosed in JP A 3-275946 a method of forming a course of supply and collection of a coolant by perforating the inside of the rotor is proposed.

Further, in the gas turbine disclosed in JP A 7-189739, an axial collection flow path is formed at a stacking connecting portion of a turbine rotor, and it is made so that the air after cooling blades is collected in the combustion chamber through the collection flow path.

For constructing a coolant collection type gas turbine, it is necessary to form inside a turbine rotor a supply flow path for supplying a coolant for moving blades and a collection flow path for collecting the coolant after cooling. However, since cooling the moving blades increases the temperature of the coolant used therefor, thermal stresses occur in the rotor components having both the supply flow path and the collection flow path because of difference in coolant temperature.

In a gas turbine of 1500° C. class combustion gas temperature, since the temperature of a coolant rises to about 200–250° C. in the case of air cooling and to about 150–200° C. in the case of vapor cooling, excessively large thermal stresses beyond an allowable value may occur depending on construction of a flow path. Therefore, in order to realize a coolant collecting gas turbine of high efficiency by making the combustion gas temperature higher, it is desirable to form a coolant supply flow path and a coolant collection flow path inside the rotor so as to reduce thermal stresses.

Further, in a coolant collecting gas turbine of an air cooling type in which moving blades are cooled by using a part of compressed air for combustion and the air after cooling is collected in a combustor, it is necessary to raise a collection pressure to at least a discharge pressure of the compressor. Therefore, the coolant is pressurized by a boost compressor before being supplied. However, because of high temperature, increasing a flow rate of the coolant inherently increases compression power of the boost compressor, so that it influences greatly the efficiency of the whole gas turbine system. Therefore, in order to attain an expected high efficiency, it is necessary to devise a flow path construction which is able to extremely reduce a pressure loss of the coolant flowing inside the rotor. Those points are not considered in any of the prior art.

In the closed cooling gas turbine disclosed in JP A 7-189739 or JP A 9-13902, both a supply flow path and a collection flow path for cooling blades are disposed inside a rotor, so that thermal stress occurs in construction components of the rotor because of the above-mentioned temperature elevation of coolant.

Thermal stress is influenced by the structure of a rotor and a flow path, and the thermal stress also can be reduced by measures for thermal shielding. However, since the rotor is a rotary body rotating at a high speed, the structure thereof is limited with respect to the strength. Although it is possible to form relatively easily a flow path at a stacking connecting portion, including the thermal shielding measures, the flow path construction has many problems such that branching and joining are necessary for forming communication flow paths between the flow path and blades at an outer periphery because many blades are connected, and stress is apt to increase upon perforation of the flow path because the disk has a thin thickness at the outer periphery side. Further large thermal stress occurs due to temperature difference between the side faces of the disc when counter flow is effected between coolant supply and coolant collection on the both side faces of the disc.

Further, a supply temperature of a coolant, of about 250° C. is effective in view of operation of the gas turbine system, and in this case, a collection temperature is 400–500° C. Thereby, the temperature of some portions goes beyond an allowable temperature of a turbine rotor material usually used, so that it is necessary to use a material of high heat resistance and high cost.

SUMMARY OF THE INVENTION

A first object of the present invention is to provide a coolant collection type gas turbine in which thermal stress in the rotor and pressure loss is reduced and the efficiency is high.

A second object of the present invention is to provide a coolant collection type gas turbine which is able to sufficiently reduce thermal stress of a rotor portion, caused by collecting a coolant for moving blades and to collect the coolant at a high efficiency.

In order to achieve the above objects, a gas turbine according to the present invention is characterized by comprising a compressor discharging compressed air, a combustor for mixing and burning fuel and the compressed air, a turbine which has nozzles arranged at an outer periphery side of a turbine rotor and moving blades with a coolant flow path and is connected to the compressor and driven by combustion gas supplied from the combustor, a first coolant flow path inside the turbine rotor, in which a coolant supplied from an axial end thereof flows to the inside of a first moving blade positioned at the most upstream side, and a second coolant path inside the turbine rotor, in which a coolant extracted from the compressor and supplied through a connecting portion between the compressor and the turbine flows to the inside of downstream side moving blades having coolant paths.

For example, it is characterized to have, inside the above-mentioned turbine rotor, a first coolant flow path in which a coolant supplied from an axial end flows to be supplied into first moving blades positioned at the most upstream side and a second coolant flow path in which a coolant extracted from the above-mentioned compressor and having a lower pressure than the above-mentioned coolant flows to be supplied into second moving blades positioned at the most downstream side of moving blades having coolant paths inside a portion connecting the compressor and the turbine. Further, for example, it is characterized to have a second coolant flow path in which a coolant having a higher temperature than the coolant flowing in the first coolant flow path flows.

Even in a gas turbine provided with moving blades arranged under the conditions that temperature, etc. differs greatly from a front stage side and a rear stage side, it is possible to suppress thermal stress, reduce a pressure loss and effect a good cooling, by optimum supply or collection of different coolants.

Further, the present invention is characterized by comprising a compressor for discharging compressed air, a combustor for mixing and burning the compressed air and fuel, a turbine having a turbine rotor, nozzles arranged at an outer periphery side of the turbine rotor and moving blades with a coolant flow path, connected to the compressor and driven by combustion gas supplied from the combustor, a course or path for supplying a coolant to the other end of the turbine rotor, a course supplying a coolant extracted from the compressor to a compressor side end of the turbine rotor through a portion connecting the compressor and the turbine, a first coolant flow path, inside the above-mentioned turbine rotor, allowing a coolant introduced from the other end of the turbine rotor to flow toward the above-mentioned compressor side end, and arranged so as to communicate with coolant flow paths formed in moving blades at the most upstream side, a coolant collection line supplying the coolant after cooling the above-mentioned moving blades at the most upstream side into the compressed air discharged from the compressor, a second coolant flow path, inside the above-mentioned turbine rotor, arranged inside the turbine rotor so as to allow the coolant introduced from a compressor side end into the turbine rotor to flow toward the other end side of the turbine rotor and communicate with coolant flow paths formed in moving blades of the second stage from the most downstream side, and a discharge path formed in the above-mentioned moving blades in the second stage from the most downstream side so as to discharge the coolant having been supplied and raised in temperature into the above-mentioned combustion gas flow.

Thereby, it is possible to suppress complication of flow path construction, reduce a flow rate of a high pressure coolant supplied into compressed air discharged from the compressor, suppress a pressure loss accompanied by supply and collection of the coolant to a small amount as a whole, and operate the gas turbine at a high efficiency.

Further, the present invention is characterized by comprising a compressor rotor having a plurality of discs axially arranged, with each having moving blades at the outer periphery side, a compressor having stationary vanes and the moving blades arranged at the outer periphery portion of the compressor rotor and discharging compressed air, a combustor mixing and burning the compressed air and fuel, and a turbine having moving blades and nozzles, connected to the compressor and driven by combustion gas supplied from the combustor, the above-mentioned discs having a gap portion between adjacent discs in a region including a central axis portion of the above-mentioned rotor, an annular connecting portion contacting with a disc adjacent to an outer periphery side of the region including the above-mentioned central axis portion of the rotor and an air extraction port for supplying a part of compressed air flowing in the compressor into the rotor, each formed therein, wherein a disc at a downstream side of the disc having the air extraction port formed therein has a compressor cooling flow path in which air extracted from the air extraction port flows in the contacting portion or in an outer peripheral portion of the contacting portion, a communication path communicating the above-mentioned cooling flow path and the above-mentioned gap portion, and a communication hole communicating each of said gap portions to the region including the central axis portion, each formed therein, and wherein a course supplying extracted air flowed in the above-mentioned compressor cooling flow path or the above-mentioned gap portion into the turbine is provided at the connecting portion between the compressor and the turbine, and a course leading, as a coolant, the extracted air flowed in the above-mentioned connecting portion to moving blades at the second stage form the most downstream side of the turbine, a course supplying a coolant to a downstream end of the turbine and a course leading, as a coolant, the above-mentioned coolant to moving blades at the most upstream side of the turbine, each are provided inside the turbine rotor.

Thereby, by effecting optimum supply or collection of different coolants, it is possible to suppress thermal stress to a small value and cool sufficiently while reducing a pressure loss. Further, it is possible to effectively cool a region the temperature of which becomes high such as a high pressure portion of a downstream side among blade rows of the compressor.

Further, it is characterized in that a coolant supply flow path for supplying a coolant for cooling moving blades and a coolant collecting flow path for collecting the coolant after cooling the moving blades are provided inside the turbine rotor, a heat shielding header is provided between the moving blades and the coolant supply flow path or the coolant collecting flow path, the heat shielding header and the coolant supply flow path or the coolant collecting flow path are connected by at least one communication path, communication pipes are provided between the heat shielding header and the moving blades, and the coolant is supplied to and collected from the moving blades through the heat shielding header and the communication pipes.

Further, the gas turbine is constructed so as to provide a ring-shaped projection concentric to the turbine rotor on an outer peripheral wall of the above-mentioned heat shielding header, and a ring-shaped concave engaging with the above-mentioned projection. Further, the above-mentioned heat shielding header is made so as to be able to be divided into a plurality of sections in a peripheral direction. Further, a pipe forming the above-mentioned communication path is made by a member different or separate from a main body of the heat shielding header, and the connecting portion between the main body of the heat shielding header and the pipe forming the communication path is made to be a sliding fitting.

Further, a gas turbine comprises a combustor producing combustion gas, a plurality of moving blades arranged in a flow path in which combustion gas flows, a disc supporting the moving blades, a distant piece, one end of which is connected to the disc and the other end is connected to a compressor compressing combustion air, and a coolant collecting flow path, provided at those connecting portions, for collecting a coolant after cooling the moving blades, and the turbine is made so as to provide a spacer intervening between the distant piece and the disc, form, at the connecting portion between the spacer and the distant piece, a flow path extending radially and having a heat shielding member provided on the peripheral wall, and collect the coolant after the moving blades into the combustor through the flow path. Further, sealing devices are provided at each of an outer peripheral end of the distant piece and the spacer, a central hole is formed at a radially central portion of the distant piece, and a communication hole passes through between the sealing devices at the outer periphery portion from the central hole.

That is, in the gas turbine thus formed, since the heat shielding header connected by the coolant collecting flow path and the communicating path and connected to the moving blades by the communication pipes of the same number as the number of the moving blades between the coolant collecting flow path (or coolant supply flow path) and the moving blades, and the coolant is collected from each of the moving blades through the heat shielding header and the communication pipes, thereby a lot of moving blades, that is, a moving blade group having a lot of coolant introduction outlets and the coolant paths inside the rotor can be smoothly connected, a quantity of heat conduction from the flow paths to the disc is decreased by the heat resistance of an air layer formed between the disc and the heat shielding header and the thermal stress is reduced greatly, and thermal stress at the rotor portion, caused by collecting the coolant for moving blades can be sufficiently reduced.

Further, since the spacer is inserted between the distant piece and the disc, the flow path extending in a radial direction and provided with a heat shielding member in the peripheral wall is formed in the joining portion between the spacer and the distant piece, and the coolant after cooling is collected into the combustor through the flow path, a part of the coolant supplied for the moving blades is led to the outer periphery of the distant piece, the distant piece and the rotor member around the distant piece are cooled, the rotor member can be kept at a low temperature, and thermal stress caused in the rotor member by collecting the coolant for moving blades can be sufficiently reduced.

DESCRIPTION OF THE PREFERRED EMBODIMENTS

An embodiment of the present invention is explained hereunder in detail.

Figure 1:
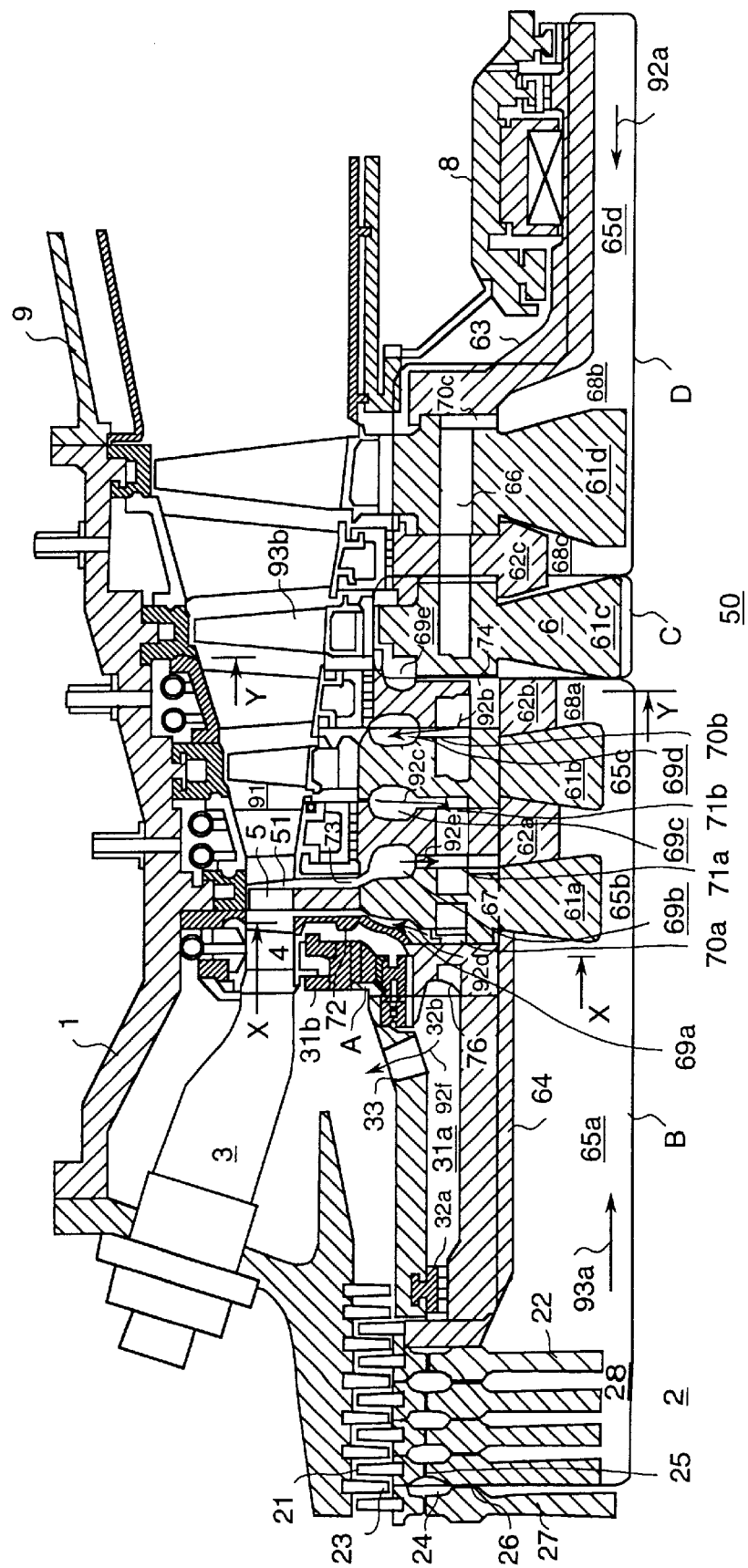
FIG. 1 is a sectional view of an upper half of a coolant collection type gas turbine of an embodiment of the present invention.

FIG. 1 shows a sectional view construction of an upper half of a closed air cooling type 4 stage gas turbine. In FIG. 1, the gas turbine comprises a casing 1, a compressor 2 arranged inside the casing 1 for compressing air and discharging compressed air, a combustor 3 for mixing compressed air and fuel and burning the mixture, a turbine 50 having nozzles 4, moving blades 5, a turbine rotor 6, etc., a bearing 8 and an exhaust duct 9. The moving blades 5 are supported on the outer periphery of the turbine rotor 6. Cooling flow paths 51 are formed inside the moving blades of the first to the third stage, and the shape of each cooling flow path 51 is different depending on thermal stress so as to be able to bear a thermal load of the combustion gas flowing in the gas path 91.

The turbine rotor 6 comprises four discs 61a to 61d, each with moving blades mounted thereon, three spacers 62a to 62c and a shaft 63, and they are connected at a hub by bolts. The turbine rotor 6 is connected to a rotor of compressor 2 through a distant piece 64. Central holes 65a to 65d are formed in the distant piece 64, discs 61a, 61b of the first stage and the second stage and the shaft 63, respectively. Discs of the third stage and the fourth stage each are solid.

At the hub of the rotor, a plurality of supply main flow paths 66 each axially passing through the first to fourth discs and a plurality of collecting main flow paths 67 passing through the distant piece 64, the first stage disc 61a and a 1/2 stage spacer 62a (a spacer between the first stage disc and the second stage disc) are arranged in a peripheral direction. One end of each supply main flow path 66 communicates with the central hole 65 of the shaft at a downstream side through an inside cavity 68d at the downstream side of the fourth disc 61d and a supply slit 70c, and one end of each collecting main flow path 67 is opened in a wheel space 31a partitioned by seals 32a and 32b.

Further, at the hub joining portion of the distant piece 64, the first and second discs 61a, 61b and a 2/3 stage spacer 62b, supply slits 70a and 70b are formed, and at both side joining portions of the 1/2 stage spacer 62a, collection slits 71a and 71b are formed. One end of the supply slit 70 and one end of the collection slit 71 communicate with the supply main flow paths 66 and the collecting main flow paths 67, respectively. The other ends of the slits communicate with the cooling flow path 51 for moving blades through cavities 69a to 69d at the outer side of the hub and a supply hole 72 and collection hole 73 at the outer peripheral portion of the disc.

Further, at the hub joining portion of the 2/3 stage spacer and the third stage disc, a gas extraction system slit 74 radially extending and communicating an inner cavity 68a and an outer cavity 69e of the hub is formed.

On the other hand, the rotor of the compressor 2 is composed of a plurality of discs 22 each having moving blades 21 planted on the outer periphery, and an air extraction port 23 is formed at a root of each moving blade of a specific stage selected from intermediate stages. Discs at a front stage side of the air extraction port 23 are solid and the discs at a rear stage side of the air extraction port 23 each have a central hole 28 formed therein which is a communication hole communicating gaps between the discs, and the air extraction port 23 is communicated with the central hole 28 through an outer cavity 24 of the hub, a plurality of slits 26 and an inner cavity 27. Further, the outer cavities 24 are communicated with each other at the outside of the hub by communication holes 25 which are communication flow paths.

Figure 2:
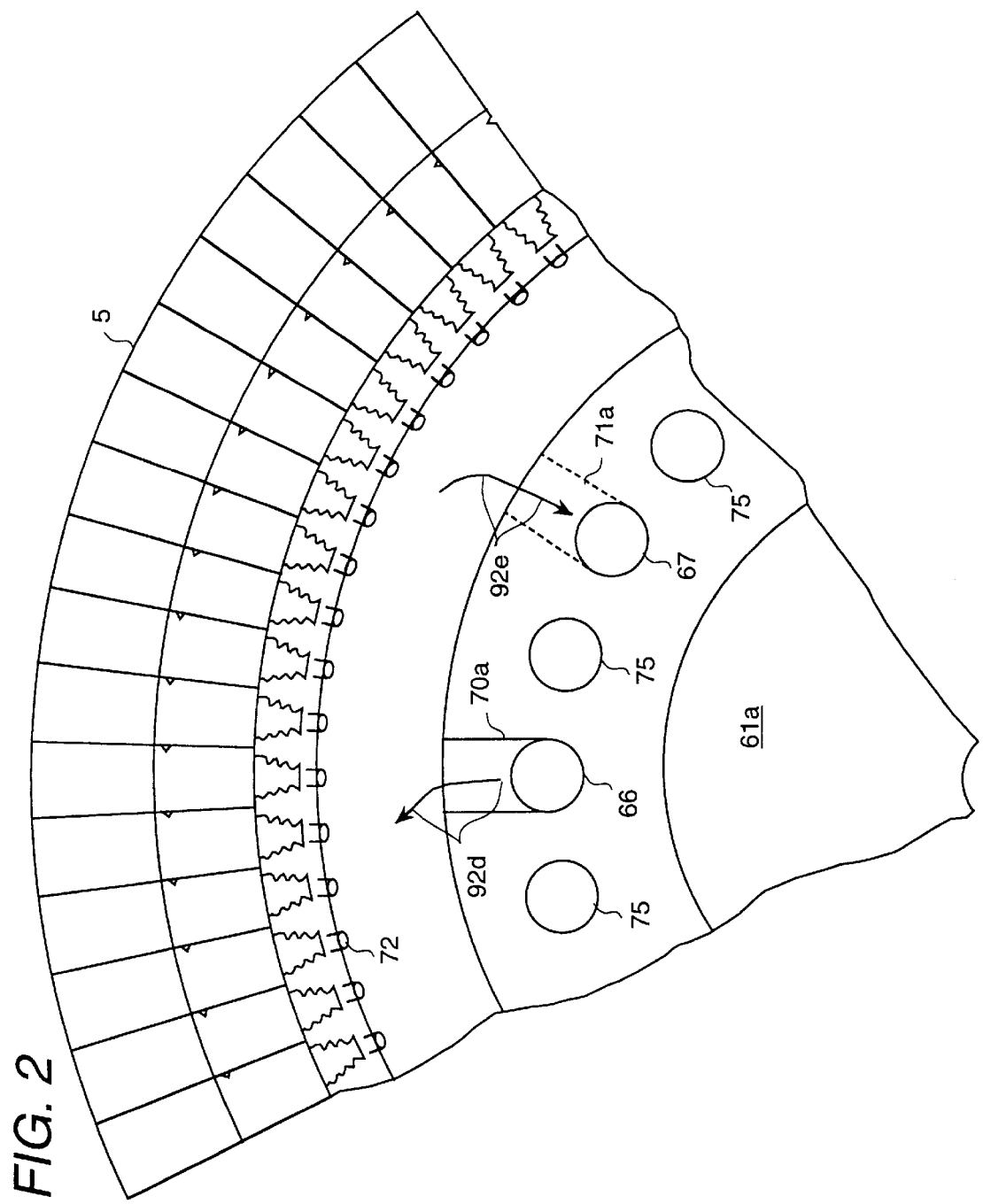
FIG. 2 is a view taken along a line X—X of FIG. 1.

FIG. 2 shows a view viewed along line X—X of FIG. 1, the supply main flow paths 66 and the collecting main flow paths 67 are alternately arranged midway between a plurality of bolt holes 75 arranged in a circumferential direction of the hub. The number of supply holes 72 and collection holes formed at the outer periphery of the disc is the same as the number of the moving blades.

Figure 3:
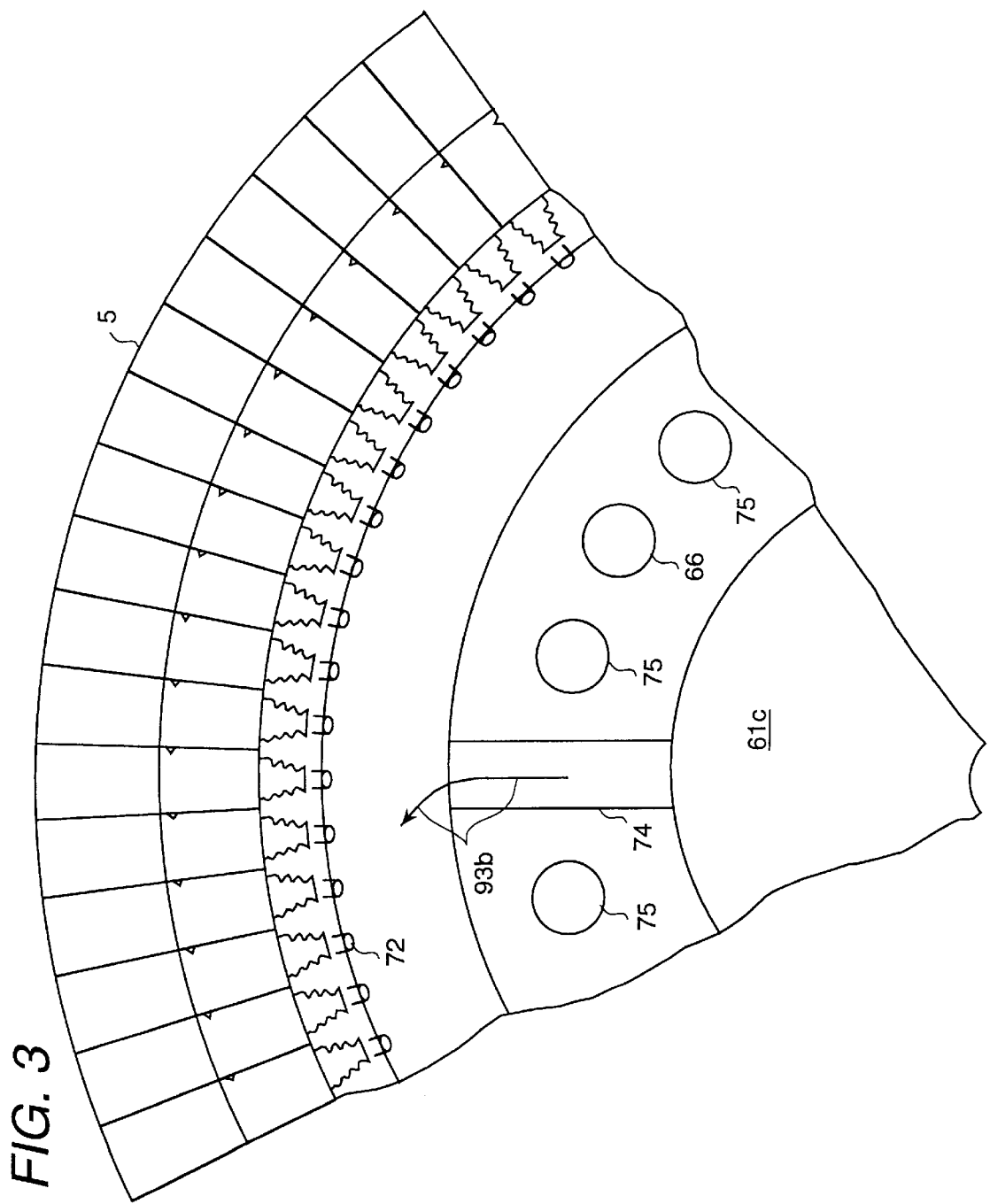
FIG. 3 is a view taken along a line Y—Y of FIG. 1.

FIG. 3 shows a view viewed along line Y—Y of FIG. 1, the gas extraction system slits 74 and the supply main flow paths 66 are alternately arranged in the peripheral direction.

A coolant supplied from an end of shaft 63 of the turbine rotor upon starting of the gas turbine is introduced, as shown by an arrow 92a, into the supply main flow paths 66 formed in the hub so as to axially pass through the discs and spacers through the central hole 65d of the shaft 63, the cavity 68b at the rear side of the fourth stage disc and the slit 70c.

A part of the coolant introduced in the supply main flow paths 66 is supplied into the second stage moving blades (as shown by an arrow 92b) through the slit 70, cavity 69d and supply holes 72 at the outer peripheral portion of the disc. The coolant after cooling the moving blades is introduced into the collecting main flow paths 67 (as shown by an arrow 92c) through the collection holes at the outer peripheral portion of the disc, the cavity 69c at the front side of the disc and the collection slit 71d, discharged into the wheel space 31a from the discharge port 76 of the distant piece hub, and then collected in the combustor side through collection holes 33 of an inner barrel. The collection coolant is supplied into the combustor together with air discharged from the compressor.

Any remaining coolant except for the coolant for the second stage moving blades, is supplied into the coolant flow paths 51 of the first stage moving blades 5 (as shown by an arrow 92d) through the supply slit 70a at the front side of the first stage blade, cavity 69a and supply holes 72 at the outer peripheral portion of the first stage disc. The coolant after cooling the moving blades is introduced into the collecting main flow path 67 (as shown by an arrow 92e) through the collection holes 73 at the rear side of the disc, cavity 69b and collect slit 71a of the joining portion of the hub, and in the similar manner to the cooling the second stage moving blade, is collected into the combustor side through the discharge hole 76 and wheel space 31a. That is, the coolant for the first stage moving blades flows so as to circulate around the outer side of the disc, and coolants of the 2 systems of supply and collection pass through the hub.

On the other hand, the coolant extracted from the air extraction port 23 of the compressor outer peripheral portion at an intermediate stage portion is distributed approximately evenly to cavities 24 on the downstream side of the outer side of the hub by the communication holes 25, and then the distributed coolants are joined in the central hole of the disc through the slit 26 and cavities 27 at the inner side of the hub. The joined coolant flows in the central portion of the turbine rotor through the central hole 65a of the distant piece (as shown by an arrow 93a). Inside the turbine rotor, the coolant is supplied in the cooling paths in the third stage moving blades through the central holes 65b, 65c of the disc, cavity 68a, gas extraction system slit 74 and cavity 69e of the hub outer periphery (as shown by an arrow 93b), cools the same moving blades and then is discharged into the gas path 91 (as shown by an arrow 93b).

As mentioned above, by constructing, inside the rotor, a coolant supply system in which a coolant is supplied from the shaft end and an extraction coolant system in which a coolant is supplied from the compressor, the hub positioned midway of the radius of the rotor is an axial coolant path for moving blades, communication paths with the moving blade are formed in the radially outer side of the hub, the means for the extraction of coolant extracted from the compressor are formed in the radially inner side of the hub, and the shaft end supply flow path 68b and air extraction flow path 68a are partitioned by a solid disc 61d of the final stage, whereby 3 systems of supply, collection and air extraction can be formed simply and without interconnecting.

Further, the main flow paths for supply and collection of coolant for moving blades are formed in the hub portion joining the discs, shafts, etc., the supply main flow path is communicated with the supply port of the shaft end, and the collection main flow path is opened to the wheel space at the first stage side. Further, the supply slit and collection slit are formed at the joining portion of the hub so that the one ends thereof communicate with the supply and collection main flow paths, respectively. Further, the slits are formed which communicate with the central hole of the above-mentioned disc at the hub joining portion of the third stage disc having the third stage moving blades at the final stage side of moving blades provided with coolant flow paths.

With this structure, the coolant supplied from the above-mentioned shaft end port is supplied into the moving blades before the third stage through the supply main flow path and supply slits, the coolant after cooling is collected into the combustor side through the collection slit and collecting main flow path. Further, compressed air having an intermediate temperature between above-mentioned supply coolant and collection coolant is extracted from the compressor, this air is supplied to the third stage moving blades through the central hole of the disc and the slit of an n-stage disc.

Thereby, the hub positioned midway of the radius of the rotor is made into an axial coolant path for moving blades, communication paths with the moving blade are formed in the radially outer side of the hub, the for the extraction of coolant from the compressor are formed in the radially inner side of the hub, and the shaft end supply flow path 68b and air extraction flow path 68a are partitioned by a solid disc 61d of the final stage, whereby 3 systems of supply, collection and air extraction can be formed simply without interconnecting. In addition to that, reduction of thermal stress at the time of steady and unsteady operation of the above-mentioned rotor, cooling of the compressor rotor, collection of the coolant, etc. become effective.

Further, in the central hole of the rotor, although it is known that a lot of pressure loss occurs by eddy flows before entering the central hole, the pressure loss is small because a flow in the central hole is not included in the flow path structure for the coolant supplied from the shaft end, and boost compression power for the coolant can be suppressed to a minimum value.

Further, the shaft end supply portion, the joining portion between the disc at the outer periphery of the outer side cavity 68 and the spacer, the fitting portion of the disc and moving blades, the sealing portion 32b of the wheel space 31a, etc. are considered as leak portions of flow lines at which leaks may occur. However, leakage from the joining portions and fitting portions can be prevented by contact surface sealing, and additionally, the coolant leaked from the seal portion 32b can be used as sealing air for preventing combustion gas leakage from the gas path to the wheel space 31b, so that most of the coolant supplied from the shaft end can be effectively collected.

Since the radial position of the discharge port 76 can be made to be ½ or less, a pumping power loss accompanied by discharging the coolant can be reduced to ¼ or less.

By causing the coolant extracted from the compressor to flow in parallel in the flow paths 24 to 28 formed in the side faces of the discs, and introducing the coolant into the central portion of the turbine rotor 6 through the distant piece 64, it is possible to uniformly cool discs of high stages of the compressor. Additionally, the distant piece heated from the outer periphery by the collection coolant can be cooled from the inside. Therefore, it is possible to raise a compressor discharge pressure without raising the heat resistance of the rotor material to any significant degree. Further, when the temperature of extracted coolant is set to an intermediate temperature between the shaft end supply coolant and collection coolant, a low temperature portion around the shaft end supply main flow path 66 formed in the hub is heated, and a high temperature portion around the collecting main flow path 67 is cooled, whereby a function of damping high and low temperatures in the rotor temperature distribution is operated and thermal stress is reduced.

Further, since the extracted coolant is unnecessary to collect or withdraw, boost compression power can be served and such an advantage can be attained that the size of the compressor can be small.

Further, in the central hole of the discs, the abovementioned pressure loss occurs by eddy flows before entering the central hole and the pressure loss depends greatly on a flow rate. However, since the flow rate of each flow path decreases by dividing the extracted coolant in a plurality of flow paths between the discs, a pressure loss accompanied thereby decreases and a sufficient supply pressure to the third stage moving blades can be secured.

Since combustion gas of high temperature flows in the gas path at the same time as ignition when the gas turbine is started, the temperature of the outer peripheral side of the rotor rapidly rises in connection with the influence of a heat load from the gas path and a heat conduction area. Therefore, on the rotor central portion in which the temperature rises slowly, further larger stress than in the time of steady operation occurs. However, in the present embodiment, since the air extracted from the compressor flows in the rotor central portion at the same time as starting and the portion is uniformly heated, a great effect can be attained even for reducing unsteady thermal stress at the time of starting. Further, as for the coolant supplied from the shaft end, the flow rate, temperature, etc. can be controlled outside the apparatus, so that it is also possible to control unsteady thermal stress of the rotor to a minimum value by a supply delaying means, etc.

The reason that a coolant for the first stage moving blades is supplied from the front side of the disc is for cooling the hub of the first stage disc and the front side thereof by flowing the coolant of low temperature to the hub and the front side, whereby a temperature of the distant piece 64 and a temperature of the hub become about an average temperature of the supply coolant and collection coolant, and the temperature rise can be suppressed to a low temperature as compared with the case where only a collection coolant flows in the hub by supplying the coolant from the rear side. However, by this influence, the temperature of the outside of the 1/2 stage spacer rises near to the temperature of the collection coolant. However, a temperature gradient in the axial direction is not formed, the outer periphery and the hub are cooled by seal air and supply coolant for cooling the first stage, respectively, and a centrifugal load of the spacer is smaller than the disc loaded by the centrifugal load of the moving blades, so that a problem due to the stress is less than in the disc.

Further, by supplying a coolant into the cooling flow path 51 inside the moving blade from the front side, difference in temperature between the coolant and the combustion gas flowing in the gas path 91 is effectively formed for cooling, so that it is effective even for raising the cooling efficiency of moving blades.

Next, considering the construction of the flow paths from the viewpoint of pressure loss, the flow path length of a course from the shaft end to the combustion chamber by bypassing the cooling flow paths for moving blades is formed to be extremely short, and the flow path is formed so as to bypass the central hole flow path, the pressure loss of which is large. Therefore, the pressure loss of the course is small and the boost compression power of the coolant can be suppressed to a minimum.

However, in the central hole 28 of the compressor discs, a swirling speed of eddies increases in the course or path in which the coolant flowed out of the slit 26 of the hub flows inwardly in the cavity 27. The swirling speed energy disappears in the course of axial flow in the central hole thereby to cause a pressure loss. However, in this embodiment, since the coolant flow is divided in many flow paths and a flow rate of the coolant in each divided flow paths is made small, a swirling component of the coolant flow attenuates by friction at the wall face when the coolant flows in the cavity 27. Therefore, the pressure loss in the central hole is small. Accordingly, in a high stage side, a sufficient supply pressure to the third stage moving blade can be secured irrespective of air extraction stage.

Further, as a flow path construction in the case where air is not extracted as a coolant from the compressor, it is considered that it is most effective to reduce the loss caused by collecting a total amount of a coolant for moving blades and discharging the collected coolant into the gas path. However, in this case, it is necessary to effect boost compression of the total amount of the coolant. On the contrary, in the present embodiment, since the coolant for the moving blades of the third stage is discharged into the gas path, the efficiency of the gas turbine decreases by that discharge. However, since boost compression power is unnecessary as to the same coolant, a loss due to the discharge can be compensated.

With the construction of the present embodiment, excellent cooling can be effected while suppressing an amount of coolant necessary to compress to a small amount, and the necessary power is reduced.

As is noted from the coolant course for the first stage moving blades and the second stage moving blades, a region exposed to the collection coolant of high temperature in the turbine rotor is limited to a narrow region indicated by A which is radially outside of the hub and the front side of the second stage disc. However, about one half of a coolant-wet surface within the region is exposed to a supply coolant of low temperature, On the other hand, since the coolant extracted from the compressor flows in the region B from the compressor rotor to the central portion of the turbine rotor, members in the region B are exposed to atmosphere of the coolant of extracted air. A region C from the 2/3 stage spacer to the rear side of the third stage disc is exposed to a supply coolant and a coolant of extracted air, and the remaining region D in the rear side of the 3/4 stage spacer is exposed mainly to a supply coolant of low temperature.

As an example, in the case where a coolant of 230° C. is supplied from the shaft end and a compressed air of 370° C. is extracted from the compressor, the temperature of a collection coolant after cooling moving blades is 450–500° C. in the case of a gas turbine of a 1500° C. class. Thereby, an average temperature of the members in the region A exposed to the supply coolant and collection coolant is raised to 340–365° C. which is an average of the supply coolant and the collection coolant, and the temperature of the members in the region D exposed to only the supply coolant is raised to 220° C. which is close to the supply coolant temperature.

On the other hand, the temperature of members in the region B in which the extracted air coolant flows rises to an temperature close to the extracted air coolant temperature of 370° C., and the temperature of members in the region C rises to about 300° C. of an average temperature of the extracted air coolant and the supply coolant. Further, since the distant piece is heated at the outer periphery by the collection coolant and at the inner periphery by the extracted air coolant, the distant piece is raised to about 410–430° C. of an average temperature of both coolants.

That is, when a shaft end supply coolant of 230° C. and a compressor extracted air of 370° C. are used as a coolant for cooling the moving blades, it is possible to construct rotor inside coolant flow paths by which a rotor average temperature becomes about 430° C. or less.

Further, a temperature distribution of the hub in the axial direction changes so that the temperature in the regions A, C and D drops in the mentioned order, and a difference between high and low temperatures is small even if partial changes in each region are included, which is effective to make a minimum difference in radial elongation of the hub joining portion and reduce stress in the fitting portion.

Therefore, although the maximum centrifugal stress due to high speed rotation occurs in the disc central portion, by making the temperature of the disc central portion higher than the radially outer side, the above-mentioned centrifugal stress is damped by thermal expansion. The temperature of the hub portion becomes about an intermediate temperature of the supply coolant and the collection coolant, as mentioned above, so that by making the temperature of air extracted from the compressor higher than the intermediate temperature, the rotor central portion is heated by the collection coolant and becomes higher in temperature than the hub. Therefore, an effect of reducing stress in that portion can be attained by selecting a suitable temperature of the extracted air coolant. In this case, since the temperature of an extracted air is decided by a position of the stage of the air extraction port 23, an extraction stage at which an effect of reducing thermal stress is highest should be selected for the construction of coolant flow paths formed inside the rotor.

Further, in the present embodiment, the extraction course shown by an arrow 93c is formed in the front side of the third stage disc. However, it is also possible to form the course around the central hole and supply the coolant to the third stage moving blades from the rear side. The reason that the course is formed in the front side is for forming a cavity 68c through which a coolant does not flow between discs and reducing thermal stress caused on the side surfaces of central portion of the fourth disc 61d by difference in temperature between the shaft end supply coolant and the extracted air coolant. In the case where the difference in temperature between the shaft end supply coolant and the extracted air coolant can be made small in order to reduce thermal stress of the whole of the rotor, even if the extracted air course is formed in the rear side of the third stage disc, an effect equivalent to the above-mentioned can be attained.

In the embodiment explained above, intervening of the spacers between the discs is for reducing stress by shortening the axial span of the disc hub and the outer peripheral rim. However, it is possible to omit the spaces when the stage span of the turbine can be shortened.

Figure 4:
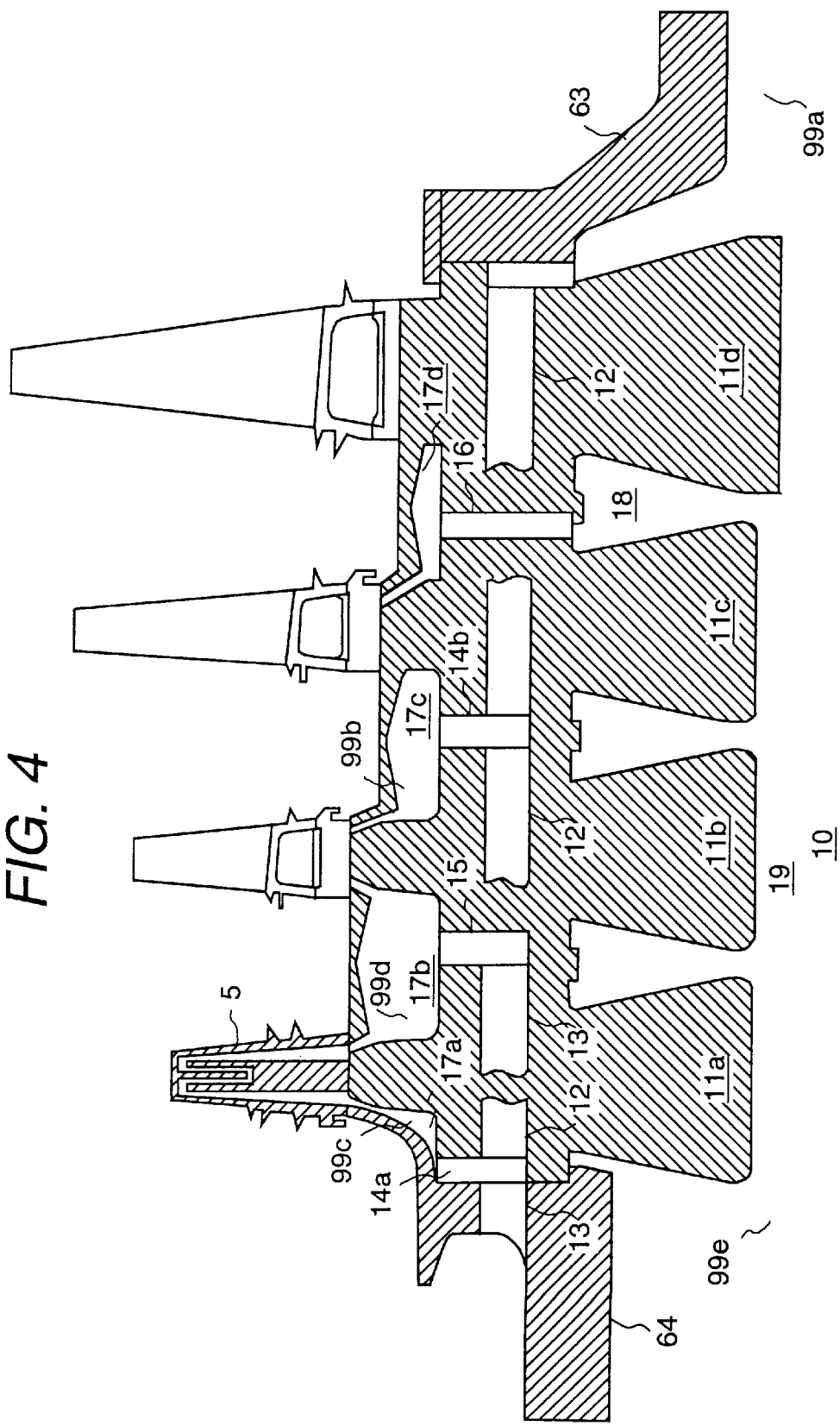
FIG. 4 is a vertical sectional view of a part of a gas turbine of another embodiment of the present invention.

FIG. 4 shows a sectional construction of a turbine rotor in which coolant flow paths are formed without intervening of spacers. The rotor 10 is composed of discs 11a to 11d and a shaft 63, and connected to the compressor rotor at the first stage side through a distant piece. The discs from the first stage to the third stage each have a central hole 19, and the disc of the fourth stage is made solid. The discs have moving blades 5 planted on the outer periphery and, particularly, the moving blades of the first to third stages are cooled from the inside.

In this case also, a supply main flow path 12 and collecting main flow path 13 of the hub can be formed in the same manner as in the above-mentioned embodiment. However, since there is no spacer, supply slits 14a, 14b, a collection slit 15 and a compressor extracted air system slit 16 are formed between the hub joining portions of the disc 11 and, particularly, the collection slit 15 is used for collecting both coolants for the first stage moving blades and the second stage moving blades.

With this flow path construction, a part of the coolant supplied from the shaft end into the supply main flow path 12 is supplied to the second stage moving blades through the supply slit 14b and an outer cavity 17c between discs, and the remaining coolant is supplied from the supply slit 17a to the first stage moving blades through the front side of the disc. After joining at the cavity 17b, the coolant is collected into the combustion chamber side through the collection slit 15 and the collection main flow path 13. On the other hand, the coolant extracted from the compressor is flowed into the central hole 19 of the turbine rotor through the distant piece, and supplied into the third stage moving blades through the cavity 18 at the inner side, the extracted air system slit 16 and the outer side cavity 17d.

In this case also, an approximately similar effect to the above-mentioned embodiment can be attained as for reduction of steady and unsteady thermal stresses and a pressure loss, cooling of the compressor rotor, etc. Additionally, there is an advantage that the rotor construction itself can be constructed simple by omitting the spacers. Further, it is also possible to make the third stage moving blades solid and the other moving blades hollow.

A different point from FIG. 1 is that a course is not taken that the coolant flowing in the central hole 65d is introduced into the supply main flow path 66 through the cavity 68b at the rear side of the fourth stage disc and slit 70c, but a course is taken in which a central hole is formed in the fourth stage disc and the coolant flowed in the central hole 65d is introduced into the supply main flow path 66 through the central hole of the fourth stage disc 61d, the cavity 68c formed between the third and fourth stage discs and the slit.

As a concrete construction, the above-mentioned rotor is as follows. A flow path (a first coolant flow path) for a coolant supplied from the shaft end uses a central hole of the disc center as a first through course constructed so as to pass through the fourth stage disc at the axis. Further, a cavity and slit (first communication course) are formed which are formed between the fourth stage disc and the adjacent third stage disc so that the coolant flowing in the above-mentioned central hole flows in the outer peripheral direction. The coolant flowing in the above-mentioned communication path is supplied into the supply main flow path 66 (second through course). The coolant flowing in the supply main course 66 is supplied into the coolant flow path in the first stage moving blades through the supply slit 70a (second communication course). A flow path (the above-mentioned second coolant flow path) for extracted air coolant from the compressor is constructed as follows. The extracted air coolant supplied through the disc central holes 65d, 65c, etc. (third through course) made so as to pass through the discs of the above-mentioned rotor at the axis from the compressor side and flowing in the central holes 65d, 65c is supplied into an extracted air system slit 74 (third communication course) directed radially outward along the disc, and constructed so as to communicate with the flow paths in the third stage moving blades to be introduced into the moving blades.

In this case also, steady and unsteady thermal stress can be damped and effective cooling can be achieved while reducing a pressure loss.

As mentioned above, according to the present embodiment, supply and collection flow paths for coolant, which are suitable to reduce thermal stresses and a pressure loss and cool the compressor rotor, are formed inside the turbine rotor, and a coolant collection type gas turbine of high efficiency can be provided.

Figure 5:
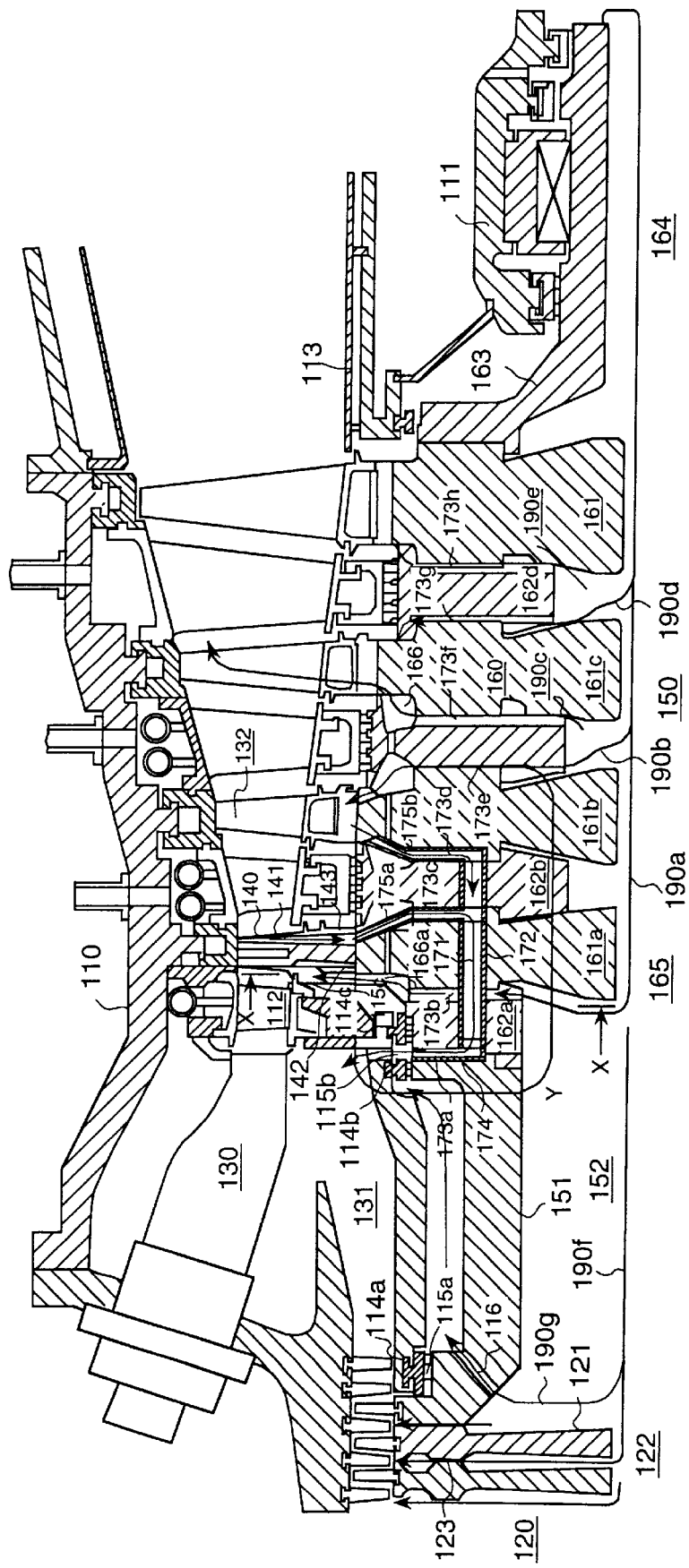
FIG. 5 is a vertical sectional view of a coolant collection type gas turbine of another embodiment of the present invention.

Another embodiment of the present invention is explained, referring to FIG. 5.

FIG. 5 shows a section of an upper half of the coolant collection type gas turbine. The gas turbine shown in FIG. 5 is an example of an air cooling type gas turbine using air as a coolant.

The gas turbine comprises a casing 110 covering the circumference thereof, a compressor 120 and a combustor 130 arranged inside the cover, a turbine 150 having nozzles 112, moving blades 140, a turbine rotor 160, etc., bearing 111 rotatably supporting the turbine rotor and an exhaust duct 113.

A plurality of the moving blades 140 are arranged on the outer periphery of the turbine rotor 160 at predetermined circumferential intervals, and coolant flow paths 141 different in shape are formed inside each of the moving blades (first to third stages) so that the matrix material of the moving blades is able to bear a thermal load of the combustion gas flowing in the gas path 132.

The turbine rotor 160 is constructed by fastening, with 4 bolts, 4 discs 161a to 161d, 3 spacers 162b to 162d and a shaft 163 at a stacking joining portion (hereunder referred to as a hub), and connected to the compressor 120 through a distant piece 151 and a spacer 162a.

Central holes 164, 152, 122 are formed in the shaft 163 supported by the bearing portion, turbine rotor discs 161a to 161d having moving blades 140 planted thereon, the distant piece 151 and discs 121 at a high stage side of the compressor rotor, respectively.

In the hub portion of the turbine rotor, a collecting flow path 171 extending axially from the spacer 162a to the spacer 162b is formed, and a heat shielding pipe 172 is inserted herein. Further, slits 173a to 173h each are formed to extend in the radial direction, and a heat shielding duct 174 is mounted in the slit 173a between the distant piece 151 and the spacer 162a. Further, heat shielding headers 175a, 175b are mounted in the slits 173c and 174d on the both sides of the spacer 162b. The others are only slits formed so that the rotor central hole 164 and cavities 166 at the radially outer side are communicated each other.

Seals 114a to 114c are provided on the outer peripheries of both ends of the distant piece 151 and the spacer 162a. A space 115a between the seals 114a and 114b is communicated with the central hole 152 of the distant piece by a communication hole 116, and an outlet of the collecting flow path 171 is opened to a space 115b between the seals 114b and 114c.

A slit 123 is formed in the hub joining portion of the compressor rotor. The central side of the slit communicates with a radially central hole 122 through a flow path between side walls of the disc 121 and the outer peripheral side is opened to a compression path through the cavity at the radially outer side of the hub.

Figure 6:
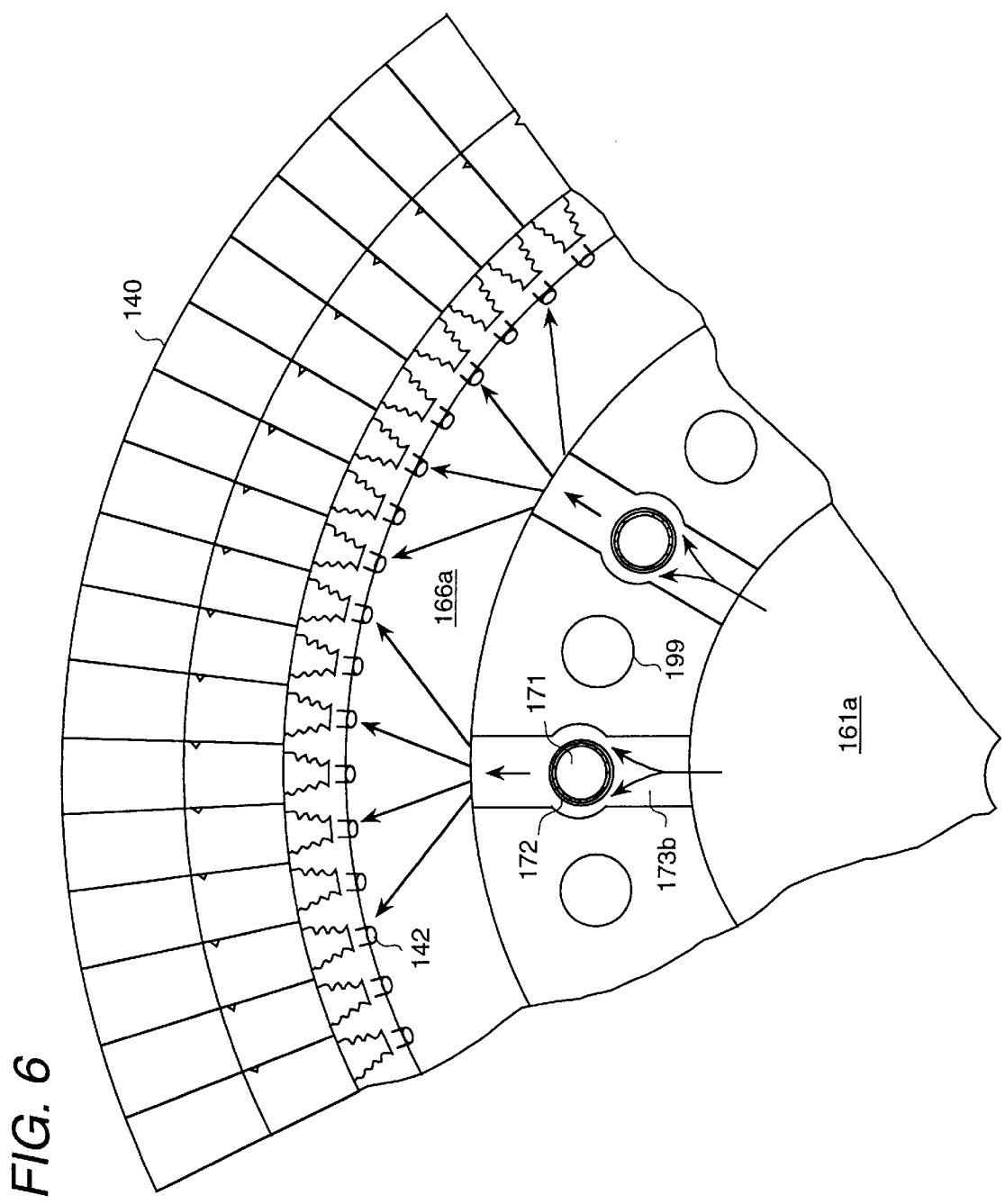
FIG. 6 is a view taken along a line X—X of FIG. 5.

FIG. 6 is a view taken along a line X—X of FIG. 5. In FIG. 6, a plurality of the collecting flow paths 171 are arranged in an intermediate phase between bolt holes 199 arranged circumferentially. The collecting flow paths 171 and the slit 173b are arranged on the same phase, however, the collecting flow path is divided by the heat shielding pipe 172. The radially outside of the cavity 166a to which slits are opened communicate with coolant introducing ports 142 of all the moving blades.

Figure 7:
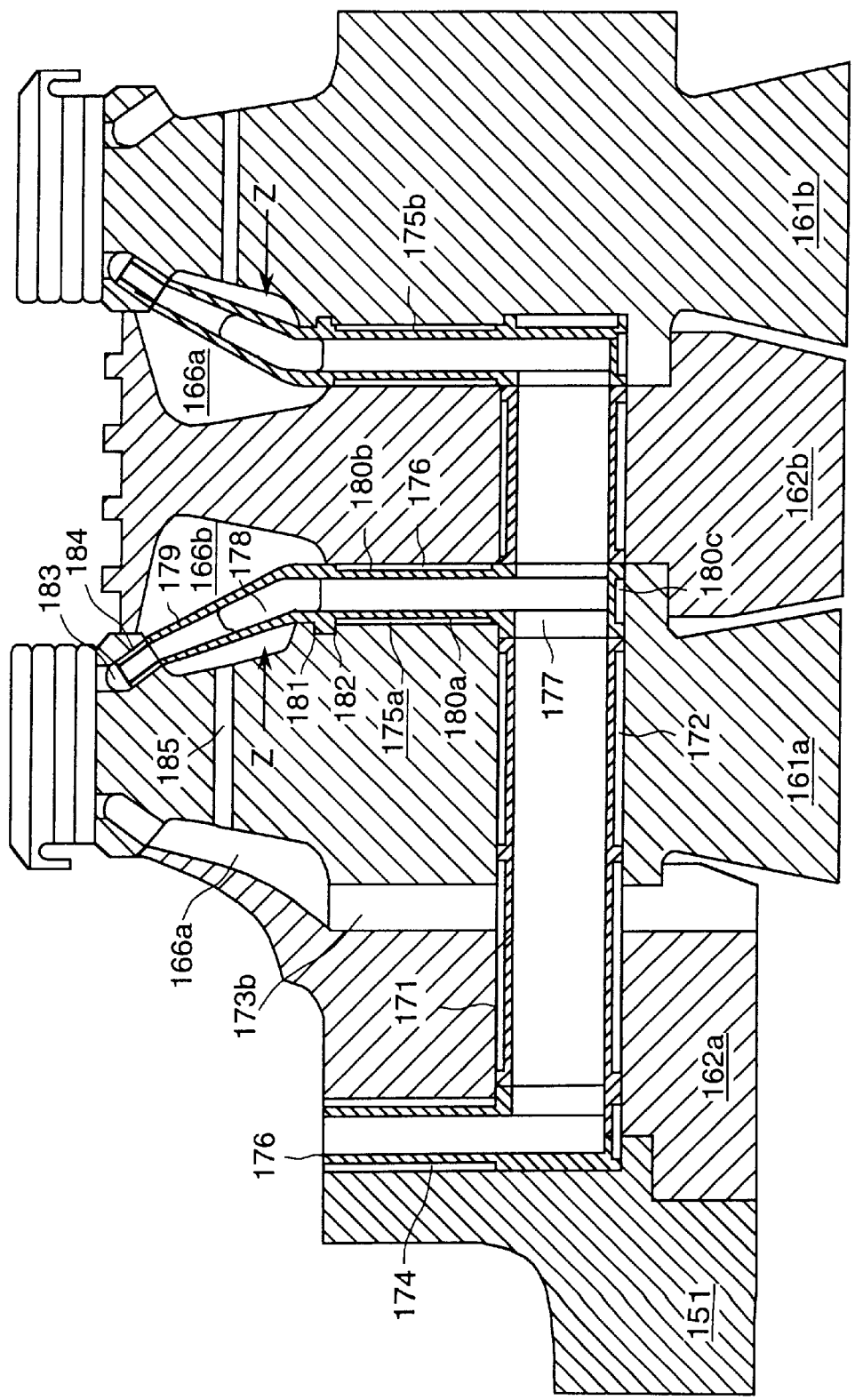
FIG. 7 is an enlarged view taken along a line Y—Y of FIG. 5.
Figure 8:
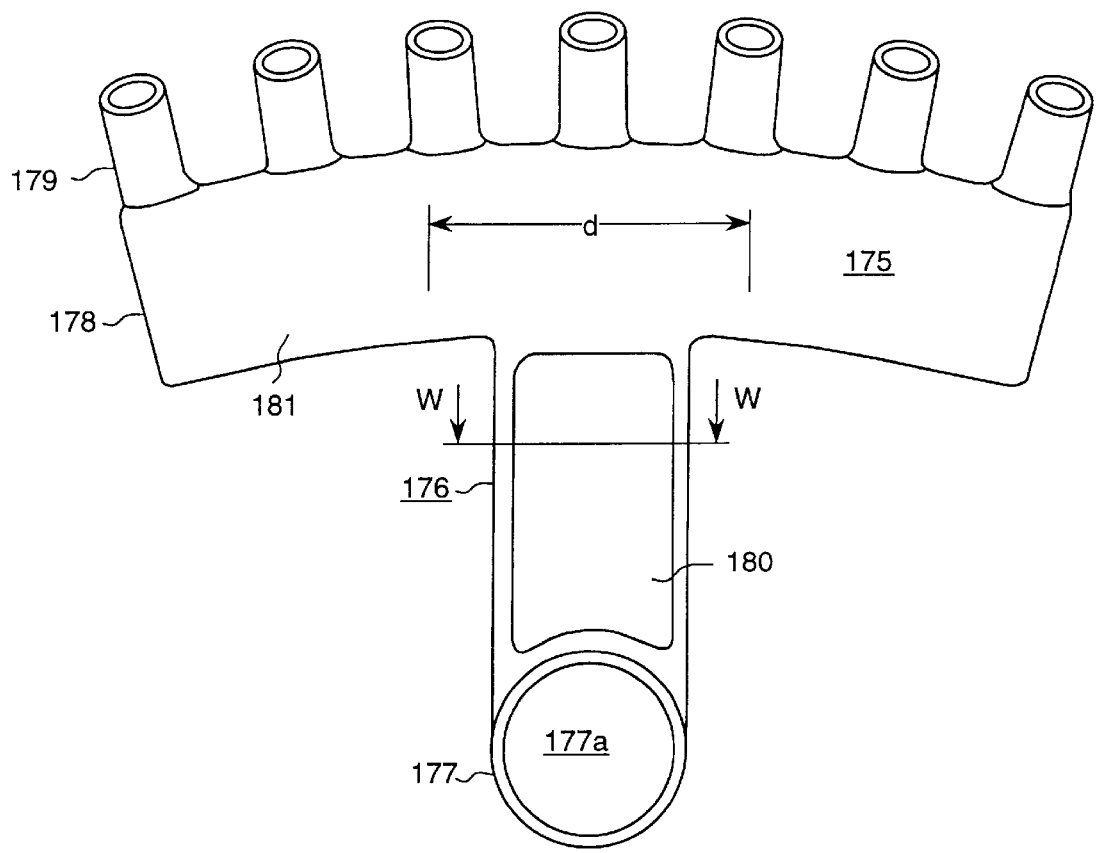
FIG. 8 is an appearance view of a header used for the coolant collection type gas turbine of the present embodiment.
Figure 9:
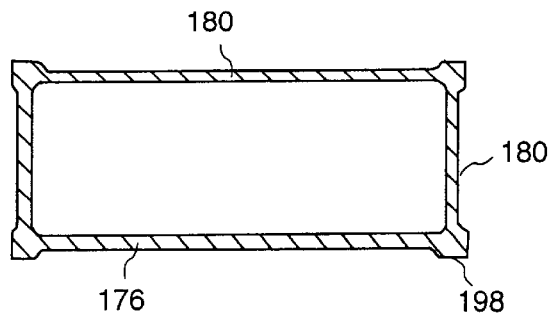
FIG. 9 is a view taken along a line W—W of FIG. 8.

FIG. 7 is an enlarged view of a Y portion of FIG. 5, and FIG. 8 shows an appearance of a heat shielding header 175 viewed from a Z direction of FIG. 7. FIG. 9 is a sectional view taken along a line W—W of FIG. 8. As is noted from those Figures, the heat shielding header 175 is constructed of a plurality of circumferentially equally divided sectors, and each sector is constructed of a duct 176 at an inner diameter side, a chamber 178 at a central portion and pipe paths 179 at the radially outer side, the number of which pipe paths is the number obtained by dividing the number of moving blades at the outer diameter side by the number of division.

A support ring 177 having an opening 177a is formed at the end portion of the duct 176, a recess 180 is formed at the side wall of the duct to minimize contact between the disc and the spacer. A flow path sectional area of the chamber 178 is sufficient to be about ½ the flow path sectional area of the duct 176. The number of pipe paths 179 is the number obtained by dividing the number of moving blades by the number of division. The side wall of each of the duct 176, chamber 178 and pipe path 179 is made thin for reducing the weight as long as the strength is secured.

A hook 181 is formed on the outer wall of the chamber 178 over all of a circumferential region. That is, a ring-shaped projection 181 concentric to the turbine rotor is provided on the outside wall surface, a ring-shaped concave engages with the projection, that is, a groove 182 is provided on the disc side and the hook 181 is engaged with the groove 182, as shown in FIG. 7. Further, the above-mentioned support ring 177 is formed so as to fit in the hole of the collecting flow path 171. By this construction, a centrifugal load acting on the chamber 178 and the pipe paths 179 is supported mainly by the hook 181, and a centrifugal load of the duct 176 and the support ring itself is supported by the support ring 177. The positions in axial and peripheral directions are fixed by the slit 173 no bolts are used for the fixing.

Upon assembling, the heat shielding header 175 is cooled and then cold-fitted in the disc. However, it is necessary to effect simultaneously fitting of the hook 181 and the groove 182 and filling of the support ring and the hole of the collecting flow path, so that an inner diameter side of the groove 181 not concerned with rotation support is formed a little smaller than the inner diameter side of the hook and the hook is able to be fitted even if the duct 176 shrunken during cooling.

The pipe paths 179 of the heat shielding header are connected to coolant outlet ports 143 at the moving blade roots through communication holes 183 perforated in a rim at the outer periphery of the disc, and inside the communication holes 183 heat shielding pipes 184 are inserted. The heat shielding duct 174 provided at the joining portion of the distant piece 151 and the spacer 162a has a shape similar to that of the duct side of the above-mentioned heat shielding header 175.

Referring to FIG. 5, a coolant (air) supplied from an end of the shaft 163 of the turbine rotor 160 by starting the gas turbine, fills the central hole 165, and then it is divided into 7 courses as indicated by 190a to 190g. The coolant supplied to the first and second stage moving blades through the courses 190a and 190b of the above-mentioned courses is a greater part of the coolant supplied from the shaft end. The coolant having cooled the moving blades and flowed out from the coolant outlet ports 143 is joined in the chamber of the heat shielding header 175, and then collected into the combustion chamber 131 through the collecting flow path 171 and the slit 173.

The coolant flows in the collecting flow path, which has elevated to a 200–250° C.-higher temperature than that of a supply coolant by cooling or heat-exchanging with the moving blades. By mounting the heat shielding header, the heat shielding header itself rises to a temperature close to that of the collected coolant. However, since gaps, formed by the cavity 166 and the recesses 180 formed on the side walls of the duct, exist between the heat shielding header and the disc and the spacer, heat conduction from the collecting coolant to the disc and spacer around the heat shielding header is greatly limited by heat resistance of the gaps.

Since the collecting flow path 171 and slit 173a have the heat shielding pipe 172 and heat shielding duct 174, substantially the same effect can be attained thereby. On the contrary, the inside of the rotor except for the coolant collecting courses is submerged in the supply coolant flowing in the courses 190a to 190c, so that the rotor material including portions around the coolant collecting courses is controlled strongly by heat conduction from the supply coolant and a uniform distribution of temperature close to the temperature of supply coolant is formed. Therefore, thermal stress generated in the rotor by collecting the coolant can be greatly reduced.

Particularly, in the course where a temperature of the rotor is rising when the gas turbine starts, a thermal load partially acting on the rotor remarkably influences the temperature distribution of the rotor, so that an effect is large even for reduction of unsteady thermal stress at the time of starting.

There is some fear that thermal stress of the heat shielding header itself may increase by thermal expansion of the heat shielding header. The thermal stress is caused by thermal elongation of the chamber 178 in the peripheral direction and thermal elongation of the heat shielding duct 176, chamber 178 and pipe paths 179 in the radial direction. As for the thermal elongation of the chamber 178 in the peripheral direction of the above-mentioned thermal elongation, measures against this can be taken by providing gaps corresponding to the elongation at the boundaries between the divided sections.

On the other hand, measures against the radial thermal elongation of the chamber 178 and pipe paths 179 can be taken by providing a gap 154a at the connecting portion between the tips of the pipe paths and the heat shielding pipes 184 provided on the rim of the outer periphery of the disc. In this case, although it is considered that the collecting coolant may be flowed out from the gaps into the cavity 166, the flowing out never occurs because no discharge port for the collecting coolant flowed out. Flowing out of the coolant from the gaps can be prevented more surely by forming the gaps 154a in the communication holes and forming the pipe paths so that the tips of the pipe paths extend into the communication holes.

This is effective even for supporting fluid force based on centrifugal force acting on the pipe paths 179 and a change in angular momentum of the coolant flowing in the radial direction. Further, it is greatly effective even for supporting inertia acting on the heat shielding header in the peripheral direction.

Further, it is considered to more effectively reduce thermal stress by providing a communication hole 185 between the cavities 166a and 166b and introducing a small amout of supply coolant into the cavity 166b to positively form a low temperature atmosphere. However, the introduced coolant is better to be collected into the collecting course and in this case the gaps at the tips of the pipe paths can be effectively used as collecting ports for the collecting course.

However, in the case where vapor is used as a coolant, although it is necessary to prevent the coolant from flowing out into the cavity and thereby prevent the vapor from condensing in the cavity, in this case, by providing elastic members such as seal rings and washer spring in the above-mentioned gaps, a sealing effect can be attained in addition to absorption of the elongation.

On the other hand, the thermal elongation of the duct 176 is restricted by the hook 181 and the support ring 177, force in the same direction as the centrifugal force is applied on the hook and force in the opposite direction to the centrifugal force is applied on the support ring 177. Thereby, stress in the support ring is reduced while stress in the hook increases. However, the stress in the hook can be reduced by thinning the thickness of a d portion of the hook positioned at the duct connecting portion as shown in FIG. 8 or by deleting that portion and absorbing it by bending deformation of the chamber wall.

Further, it is possible to form the duct and the chamber as separate pieces and assemble with a gap therebetween, that is, to assemble them to be sliding fitting so that thermal elongation can be absorbed by the gap. In this case, the recesses 180 and a collecting path inside the duct are communicated, however, since any flow is not formed in the recesses for the same reason as the case of the gaps at the tips of the pipe paths, it is unnecessary to seal the recesses.

Next, when the coolant flows out from the outlet of the collecting flow path 171 into the outside of the rotor and flows into the combustion chamber 131, the coolant of high temperature leaked from the seal 114c flows in the gas path side through the wheel space 115c, and the outer periphery of the spacer 162a is heated. However, by leading out the coolant supplied inside the rotor from the communication hole 116 to the spacer 115a by the course 190g, the coolant flows toward the seal 114a and the seal 114b, so that the outside wall of the distant piece can be sufficiently cooled by this coolant. That is, by mounting the seals 114a to 114c so as to cause the spacer 162a to intervene between the seals, the portions, the temperature of which becomes high, can be limited to the spacer 162a.

Hitherto, since the outer periphery of the distant piece is exposed to a coolant of high temperature flowing from a coolant collecting port to a compressor side, it was necessary to make it of a material of high heat resistance. However, by making the spacer of a separate member as mentioned above, it is possible to make the distant piece of a rotor material of excellent workability at a low cost.

Further, the coolant flowing in the course 190f toward the compressor rotor side is for cooling the disc 121 of the compressor rotor, and the compressor rotor can be more effectively cooled by cooling the end flange of the distant piece connected to the end of the compressor rotor with the coolant leaked from the seal 114a.

Figure 10:
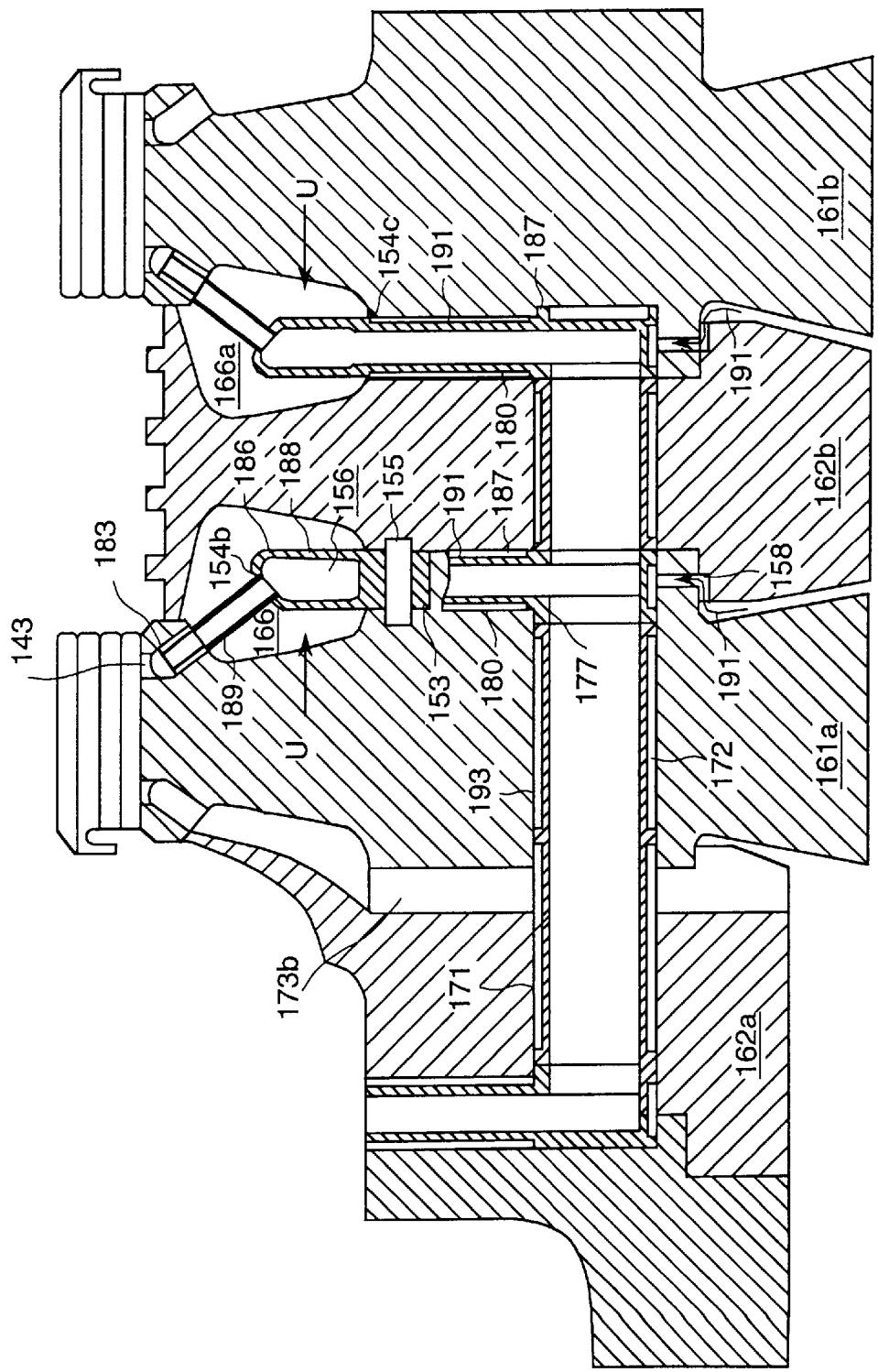
FIG. 10 is a vertical sectional view of an essential part of a coolant collection type gas turbine of another embodiment of the present invention.
Figure 11:
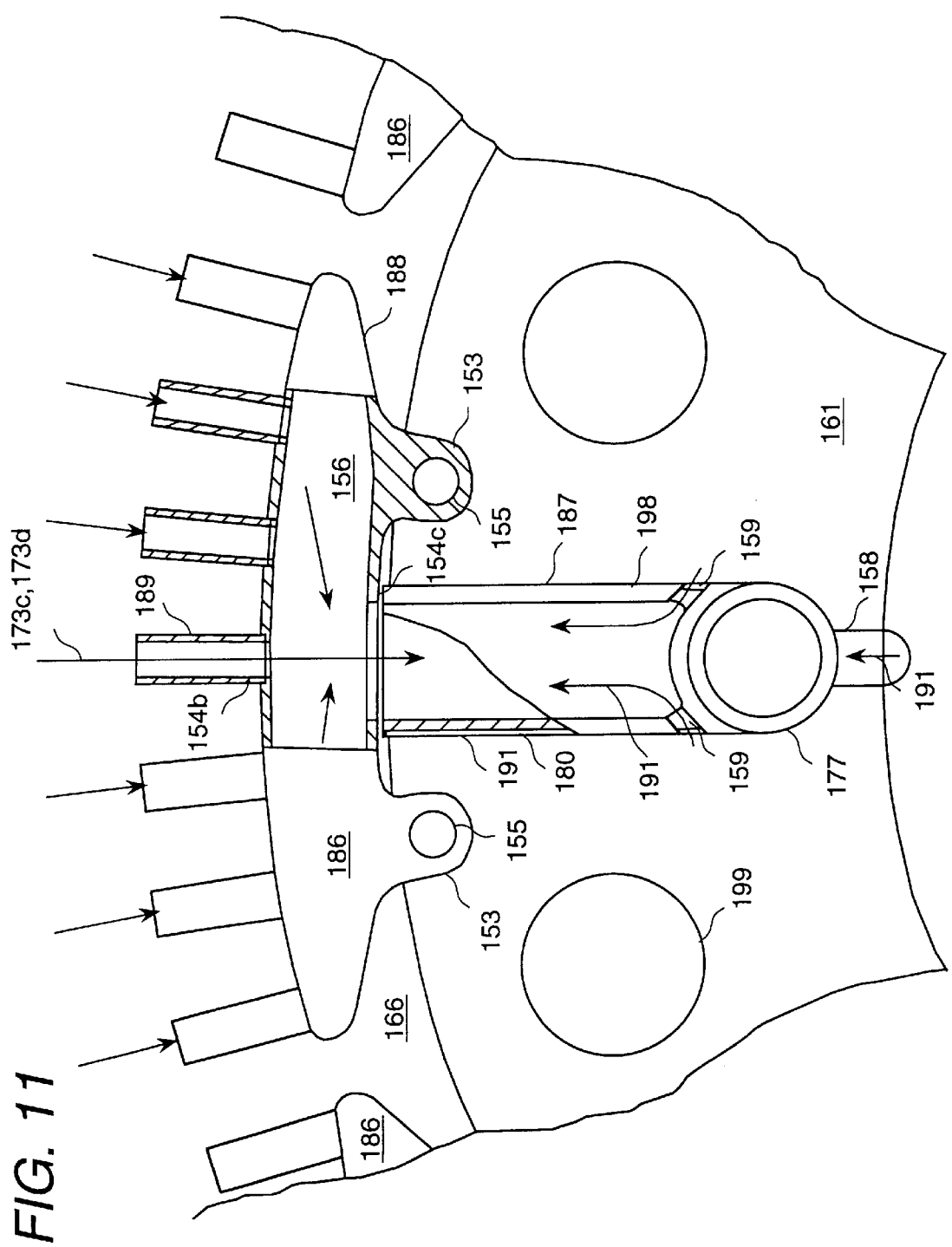
FIG. 11 is a partially sectional view taken along a line U—U of FIG. 10.

Another embodiment of the present invention, different in the construction of a heat shielding header, is shown in FIG. 10 and FIG. 11.

The heat shielding header 186 comprises a duct 187, a chamber 188 and pipe paths 189, each formed separately from each other. The duct 187 is supported by the support ring 177, the chamber 188 is supported by pins 155 inserted in hooks 153 at two positions and the pipe paths 189 is supported by the disc 161 through communication holes 183. By assembling those three kind of members into the rotor, a collecting course from coolant introduction ports of the moving blades to the collecting flow path 171 in the hub portion is formed.

A flow path 156 inside the chamber 188 is formed so that a sectional area of the flow path increases toward a downstream side according to a flow rate of a joined flow. Thereby, the chamber is made light in weight and stress caused by centrifugal force is reduced. Further, by forming separately the three kinds of members as mentioned above, thermal expansion of the members does not interfere with each other, and at the same time radial elongation of each is absorbed by gaps 154b, 154c, so that thermal stress can be reduced.

Peripheral elongation of the chamber span between the hooks is restricted by the pins 155, so that compression stress occurs in the chamber in the peripheral direction. However, the span is about ½ of the peripheral length and elongation is small, so that stress is small.

The pipe paths 189 are fitted in the communication holes 183 at the one ends by cold fitting, and since the other ends have gaps 154b between the holes of the chamber, the pipe paths are cantilevered for centrifugal force. Therefore, there is some fear that bending stress occurs in the pipe paths, the bending stress can be suppressed to an allowable range by making the gaps small, so that there is no problem in supporting structure.

Since the above-mentioned coolant course has gaps at two positions, the collecting coolant flows out of the gap 154b at the upstream side and flows in the collecting course from the gap 154c at the downstream side. There is fear that coolant flows by-passing the cavities are formed. In this embodiment, flow paths 158 and 159 are formed in the hub at the inner side of the duct 187 and the side walls of the duct, respectively, and it is constructed so that a part of the supply coolant flowing in the central hole of the disc flows into the cavity 168 through the flow paths 158, 159 and the recesses 180 of the side walls.

Since complicated coolant flow paths are formed inside the moving blade, a pressure loss is also large. Therefore, there is a large pressure difference between the supply coolant and the collecting coolant flowing the chamber. Since the coolant flowed in the cavity flows into the collecting course from the gaps 154b and 154c by the pressure difference, the above-mentioned flow by-passing the cavity can not be formed.

Further, by the above-mentioned supply coolant flow, the side wall of the duct 187 is cooled and heat conduction from a flame 198 other than the recesses of the side wall to the disc is reduced. Additionally, side surfaces around the cavity are also cooled. Therefore, a temperature distribution of the disc becomes more uniform and thermal stress caused by collecting the coolant can be reduced further. At the time of starting, since the disc is heated from both sides, there is an effect of reducing unsteady thermal stress at the starting.

Further, in the above-mentioned course for a supply coolant, the coolant is introduced from the flow path 158, however, it is also possible to provide grooves in the rib of the heat shielding pipe 172 and the support ring 177 of the duct 187 and supply the coolant from the supply slit 173b through the gap 193. In this case, also, an effect equivalent to the above-mentioned effect can be attained.

Figure 12:
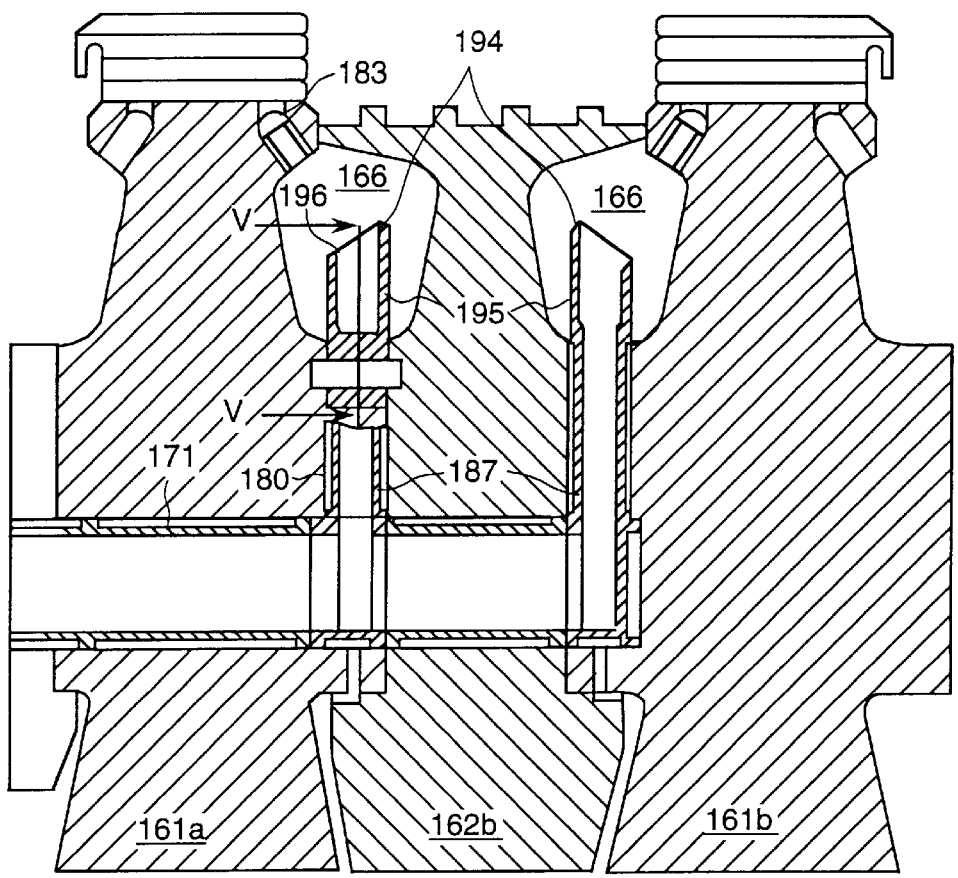
FIG. 12 is a vertical sectional view of an essential part of a coolant collection type gas turbine of another embodiment of the present invention.
Figure 13:
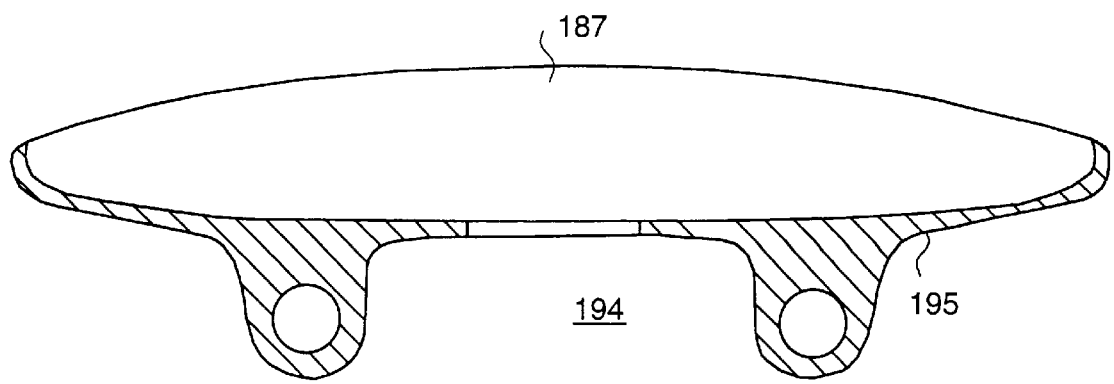
FIG. 13 is a sectional view taken along a line V—V of FIG. 12.

Another embodiment of the heat shielding header of the present invention is shown in FIG. 12 and FIG. 13.

In this embodiment, as the section is shown in FIG. 13, an outer periphery side of a chamber 195 of the heat shielding header 194 is opened, and a structure that the header is joined with paths connected to the root portions of blades through a large gap is taken. Therefore, the construction can be made simple, additionally, there is an advantage that centrifugal force of the chamber can be further reduced.

The collecting coolant flows into the inside of the cavity 166 from the communication holes 183, and then it is collected through the heat shielding duct 187. However, since chamber inflow ports 196 are opened to the communication holes 183, and a pressure loss in the collecting course from the chamber to the combustion chamber is small, the coolant flowed out from the communication holes 183 flows so as to be absorbed into the chamber, the coolant blown off from the communication holes is not directly jetted to the wall surfaces of the disc 161 and the spacer 162.

On the other hand, the supply coolant flowing in the recesses 180 of the heat shielding duct and flowed out into the cavity 166 from the outer periphery end joins the collecting coolant at the inflow ports 196 of the chamber and is collected inside the chamber, so that the cavities at the inner side than the inflow ports are filled with the supply coolant. Therefore, thermal stress occurs at the outer periphery side of the disc. However, since centrifugal stress caused in the outer periphery side is small, the resultant stress is small, and it is effective for a gas turbine in which a thermal load of the moving blade is relatively small.

In the above-mentioned embodiment, the coolant for the moving blades of the third stage is not collected and discharged into the gas path side. However, in the case where coolant including the coolant for the third stage moving blades is collected, it is achieved by adding a heat shielding header between the spacer and the disc and extending the collecting flow path 71 so as to be connected to this header.

Further, the flow path construction inside the rotor is changeable according to the scale of a gas turbine and a temperature level of combustion gas. However, as long as a heat shielding header is provided in the cavity at an outer side of a hub, even if it is provided in any cavity, the same effect can be attained. As one example thereof, it is considered that the supply course formed in the side face of the first stage disc 161a is exchanged with the collecting course, a space between the spacer 162a and the first stage disc is made as the collecting course, and a heat shielding flow path-formed header is inserted in this collecting course. Further, in order to damp an influence of the supply coolant, it is possible to provide the heat shielding header in the coolant supply course.

Further, the flow path construction changes greatly according to kinds of coolant, and in the case of vapor cooling, it is effective to collect it in the shaft end. However, in this case, also, as long as a collecting course is formed in a hub portion, any problem does not occur, the same effect as above can be attained. Further, in the above embodiments, 4-stage turbines are taken as examples, as long as they are plural stages, the number of stages of the turbines is not limited.

As variously explained above, with the coolant collection type gas turbine thus formed, as a construction of connection of the coolant flow paths and the moving blades, the communication hole is formed at the one end of the chamber, and the heat shielding header having the same number of communication pipes as the moving blades is inserted in the other end, whereby the moving blades having a lot of coolant inlets and outlets can be smoothly connected to coolant flow paths inside the rotor, a heat conduction amount from the flow paths to the disc is reduced by the heat resistance of air layer formed between the disc and the header, so that thermal stress can be greatly reduced. Further, in this case, which one of the supply course and the collecting course the above-mentioned heat shielding header is mounted on is decided according to a thermal stress occurrence condition, and in some cases it is possible to mount it on both of them.

Further, a hook, the section of which is ring-shaped, is formed on the side wall of the above-mentioned header, and a recess is formed in the side wall of the disc opposite to the hook, whereby it is possible to support a strong centrifugal load at the time of rotation without fastening by bolts.

Since the heat shielding header is divided circumferentially into a plurality of sections, slight gaps formed between the divided surfaces can allow circumferential elongation of the heat shielding header due to thermal expansion, and thermal stress acting on the heater itself can be reduced.

Further, a construction of the rotor itself is also improved. That is, in a gas turbine in which a turbine rotor formed by laminating discs and a compressor are connected by a distant piece, and a coolant after cooling moving blades is collected into the combustion chamber, a collecting flow path radially extending is formed in the connecting portion of the distant piece and a spacer through the spacer between the distant piece and a first stage disc, and a heat shielding member is mounted in the collecting flow path, whereby a thermal load of the large sized distant piece due to collection of the coolant can be reduced and thermal stress can be greatly reduced.

Seals are provided at both ends of the distant piece and the outer periphery of the spacer, while the distant piece has a central hole and communication hole passing through between the seals at the periphery from the central hole, so that a part of the coolant supplied for the moving blades is led to the outer periphery of the distant piece, the distant piece is sufficiently cooled by this coolant and it is possible to keep the temperature of its surrounding members to a low temperature.

As explained above, according to the embodiments, it is possible to sufficiently reduce thermal stress in a rotor portion due to collection of a coolant for moving blades, and it is possible to obtain this kind of a coolant collection type gas turbine which is able to effect a high efficiency collection.

What is claimed is:

1. A gas turbine comprising:
   a compressor discharging compressed air;
   a combustor for mixing and burning fuel and the compressed air; and
   a turbine, having nozzles arranged at an outer periphery side of a turbine rotor and moving blades with coolant flow paths, connected to said compressor and driven by combustion gas supplied from said combustor, wherein said turbine rotor has inside:
      a first coolant flow path in which a coolant supplied from an axial end of said turbine rotor flows and is supplied to first moving blades positioned at a most upstream side with respect to a flow of the combustion gas; and
      a second coolant path in which a coolant extracted from said compressor flows is supplied to moving blades with coolant paths on a downstream side of said first moving blades through an inside of a connecting portion between said compressor and said turbine.

2. A gas turbine according to claim 1, wherein the pressure of the coolant flowing in said second coolant flow path is lower than that of the coolant flowing in said first coolant flow path.

3. A gas turbine according to claim 1, wherein the temperature of the coolant flowing in said second coolant flow path is higher than that of the coolant flowing in said first coolant flow path.

4. A gas turbine comprising:
   a compressor discharging compressed air;
   a combustor for mixing and burning fuel and the compressed air;
   a turbine, having nozzles arranged at an outer periphery side of a turbine rotor and moving blades with coolant flow paths, connected to said compressor and driven by combustion gas supplied from said combustor;
   a first course for supplying a coolant to a first end of said turbine rotor; and
   a second course for supplying a coolant extracted from said compressor into a second end of said turbine rotor on the side of said compressor, said second end of said turbine rotor being disposed at a connecting portion of said compressor and turbine;
   a first coolant flow path arranged inside said turbine rotor to flow a coolant introduced from a side of the first end of said turbine rotor toward said compressor end side;
   a coolant collecting course for supplying, into the compressed air discharged from said compressor, a coolant after cooling the moving blades at the most upstream side with respect to a turbine inside flow of combustion gas generated in said combustor;
   a second coolant flow path arranged inside said turbine rotor to flow a coolant introduced from said compressor side end toward said first end side of said turbine rotor and to communicate with coolant flow paths constructed in moving blades of a second stage counted from a final stage at a most downstream side with respect to the turbine inside flow of combustion gas; and
   discharge paths provided in said moving blades of the second stage counted from said final stage for discharging the coolant supplied and elevated in temperature into the flow of combustion gas.

* * * * *